United States Patent [19]

Nicholls

[11] Patent Number: 4,894,270

[45] Date of Patent: Jan. 16, 1990

[54] FOLD AND BOND FOR CONSTRUCTING CEMENT LAMINATE STRUCTURAL SHAPES

[76] Inventor: Robert L. Nicholls, Civil Engrg. Dept., Univ. of Delaware, Newark, Del. 19716

[21] Appl. No.: 131,255

[22] Filed: Dec. 7, 1987

Related U.S. Application Data

[63] Continuation-in-part of Ser. No. 937,735, Dec. 4, 1986, abandoned.

[51] Int. Cl.[4] .......................... B05D 1/36; B05D 5/00; B32B 3/04; B32B 13/00
[52] U.S. Cl. .................................... 428/125; 428/290; 428/703; 52/631; 138/146; 156/227; 427/265; 427/342
[58] Field of Search ............... 428/123, 125, 195, 245, 428/289, 290, 194, 196, 236, 121, 125, 703; 427/210, 264, 265, 270, 275, 276, 342, 411, 412, 271, 340, 140; 138/145, 146, 172, 174, 175, 176; 229/920, 182, 186, 187; 156/222, 226, 227, 305; 52/723, 631, 366; 264/285

[56] References Cited

U.S. PATENT DOCUMENTS

| | | |
|---|---|---|
| 2,779,388 | 1/1957 | Quoss . |
| 3,529,516 | 9/1970 | Dorsey . |
| 4,446,083 | 5/1984 | Nicholls . |
| 4,528,238 | 7/1985 | Alford ................................. 428/284 |
| 4,563,377 | 1/1986 | Melli ..................................... 52/723 |
| 4,568,589 | 2/1986 | Briggs ................................. 428/290 |
| 4,617,072 | 10/1986 | Merz . |
| 4,617,219 | 10/1986 | Schupack ........................... 428/247 |
| 4,659,412 | 4/1987 | Newman ............................. 428/290 |
| 4,664,968 | 5/1987 | Lord .................................... 428/289 |
| 4,690,835 | 9/1987 | Halabisky et al. ................. 427/264 |
| 4,732,816 | 3/1988 | Walters .............................. 427/140 |
| 4,778,718 | 10/1988 | Nicholls ............................. 428/287 |

FOREIGN PATENT DOCUMENTS 872895 4/1953 Fed. Rep. of Germany .

OTHER PUBLICATIONS

Fold and Bond Construction of Cement Laminate Structural Shapes-Nicholls et al.

*Primary Examiner*—Michael W. Ball
*Assistant Examiner*—Louis Falasco
*Attorney, Agent, or Firm*—Mortenson & Uebler

[57] ABSTRACT

An article formed by stiffening the folds of the folded plate structure by applying a low viscosity penetrant along the folds which reacts with the cement to harden it where it has been weakened due to folding. Applications include sandwich panel roof and floor decking and siding for buildings, cylindrical sandwich panels for arch roofs and large pipes or culverts, box beams and girders, and dome roofs.

5 Claims, 4 Drawing Sheets

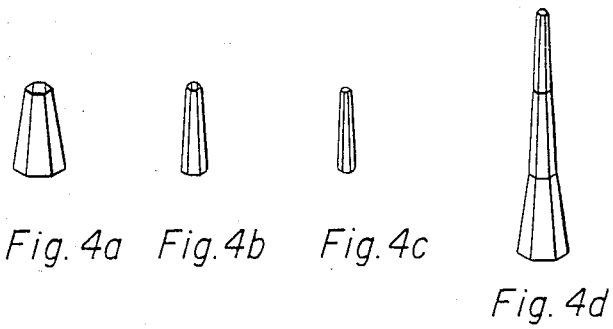
Fig. 4a  Fig. 4b  Fig. 4c
Fig. 4d
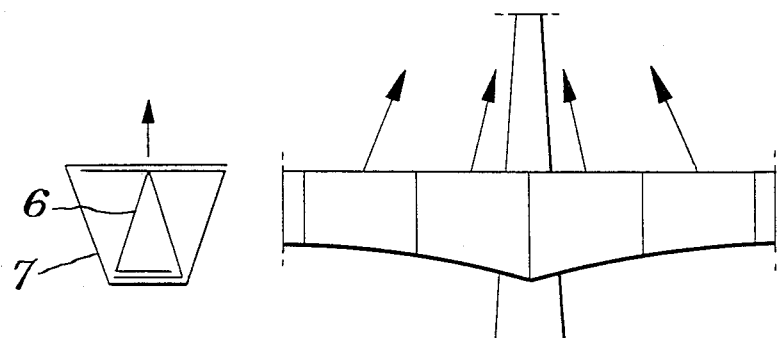
Fig. 5a
Fig. 5b

FOLD AND BOND FOR CONSTRUCTING CEMENT LAMINATE STRUCTURAL SHAPES

This application is a continuation-in-part of Ser. No. 06/937,735, filed 12-4-86 now abandoned.

REFERENCES

1. U.S. Pat. No. 2,779,388. 1/1957. Quoss
2. U.S. Pat. No. 4,617,072. 10/1986. Merz
3. U.S. Pat. No. 4,563,377. 1/1986. Melli
4. U.S. Pat. No. 3,529,516. 9/1970. Dorsey
5. U.S. Pat. No. 4,446,083. 5/1984. Nicholls
6. U.S. Pat. No. 4,617,219. 10/1986. Schupack
7. U.S. patent application, Filing No. 07/030,410 now U.S. Pat. No. 4,778,718. Fabric-reinforced cementitious sheet-like structures and their production. Nicholls

FIELD OF THE INVENTION

This invention relates to a method for constructing folded plate structures by scoring, folding, and cementing together the folded faces of fabric-reinforced cement laminates.

DESCRIPTION OF THE PRIOR ART

Many structural shapes are made by folding metal sheet or metal plate to increase its rigidity or by casting concrete or connecting precast concrete panels in the form of folded plate roofs and walls to obtain rigidity with less material.

Similar objectives are attained using other materials, by a variety of bending and roll-forming processes. Quoss [1] teaches a method for forming corrugated fabric-reinforced plastics comprising (a) dipping reinforcing fabric in a thermosetting resin, (b) forming the resin-impregnated fabric by a series of scoring rolls, forming rolls and forming dies, then (c) hardening the resin with the application of heat. The scoring rolls enable a sharper bend to be made in the still deformable material under the action of the forming rolls and dies, prior to harding with heat.

Merz [2] teaches the production of corrugated core ceramic sandwich panels by a process comprising (a) bonding together alternating corrugated and flat still deformable prepreg sheets, (b) heating in the absence of air (coking) so that only the skeletal carbon remains, then (c) high-temperature impregnation of the carbon with metallic silicon to produce a rigid silicon carbide panel.

While the Quoss and Merz teachings differ in material composition and process, they both deform the sheet materials to their final shape *before* the materials are hardened.

In corrugated board practice, by contrast, scoring is performed on a *pre-formed* product. The scoring in this case serves to compress and deform the flutes of the corrugated core of the sandwich panel in order to produce smooth, relatively sharp folds. Many experiments have been conducted at the U.S. Forest Products Laboratories and elsewhere to evaluate structural properties of folded corrugated board shapes, and patents have been granted for generic geometries of folding and for methods of assembly, including [3].

The scoring operation in corrugated practice deforms the board but does not, with proper adjustment of roll spacing, tear or fracture the board.

Many pre-scoring treatments of corrugated board are used to improve the board's stiffness (for structural applications), moisture resistance and wet strength (as for cold storage food containers), fire resistance, and fungicidal properties. In some instances, when scoring reduces the effectiveness of these pretreatments, a subsequent treatment is applied just to the fold.

Alternatively, if the pretreatment is one which stiffens the board, making it more difficult to score and fold without breaking, a softening polymer penetrant can be applied just along the fold lines before scoring, and if needed, a final stiffening or water-resistant treatment applied to the fold lines after folding. A description of one such procedure is the teaching of Dorsey [4].

Polymer fabric-reinforced cement sheet products now being developed [5-7] offer unique opportunities for making folded plate structures by scoring the sheet to weaken the cement matrix, folding the sheet along the score lines, cementing faces of the folded sheet together, then pouring a low viscosity penetrant along the fold lines to strengthen the cement damaged by folding. The polymer reinforcing fabric retains the integrity of the hinge during folding. This process resembles the scoring and folding of corrugated paperboard into useful shapes, with the added step of strengthening the product at the folds.

OBJECTIVES OF THE INVENTION

The purpose of this invention is to enable inexpensive and rapid construction of load-bearing folded plate structures from standard sheet products of polymer fabric-reinforced cements. A further objective is to provide a means for creating a wide variety of concrete shapes without the cost of special formwork or connection details for each separate shape produced. An additional objective is to provide a low-cost means for forming or partially forming such shapes either by shop assembly of field assembly, so that for any given application the four production steps of scoring, folding, cementing and strengthening the folds can be easily divided between shop and field in a manner to minimize total production cost, depending on transportation and storage requirements and on labor availability. A still further objective is to create folded plate concrete structures which have greater stiffness-to-weight ratios than possible by any existing construction methods and which are tougher for absorbing dynamic and impact loads without fracturing, by virtue of the polymer fabric reinforcing.

BRIEF SUMMARY OF THE INVENTION

The novel, nonobvious, and economically significant features of this construction method over existing methods of forming folded plate concrete structures are therefore that the folded plates can be formed from standard sheet products without the use of formwork or special connecting details, by a simple four-step process adaptable to both shop and field assembly, and that the resulting product has higher stiffness-to-weight ratio and greater impact and fatigue resistance than is possible by folded plate concrete structures built by existing methods.

This system therefore allows a structural fabricator to order stocks of several standard sheet thicknesses from which he can make folded structures to satisfy a wide variety of loading conditions according to the structural engineeers' designs. The folding and bonding of fabric-reinforced cement laminates opens the door to greater stiffness/weight ratios and greater resilience to cyclic and impact loading than is possible with any current concrete technologies, including combinations of admixtures, fiber reinforcement, and prestressing.

A key distinction between this process and the teachings of Quoss [1] and Mercz [2] is that the scoring and folding is performed on the hardened cementitious matrix product, not on the still deformable polymer matrix product before hardening. A distinction between this process and the teaching of Dorsey [4] is that Dorsey applies a treatment to soften a brittle corrugated board so that it can be folded without breaking, prior to impregnating the corrugated board with a waterproofing agent. The instant treatment does not soften the laminate so it can be folded without breaking; it stiffens the brittle laminate at the fold after it has been folded. Due to the more brittle character of the cement mortar laminate compared with either corrugated board or the still deformable products of Quoss and Merz, one suitable method to fold the mortar laminate is with a sheet metal brake or clamping vise, which would not be suitable for forming the folds in the previously disclosed methods.

BRIEF DESCRIPTION OF THE DRAWINGS

FIGS. 1 to 4 show scoring patterns and folded shapes for representative folded plate structural elements.

FIGS. 4a to 4d shows elements which can be shipped nested, then stacked on top of one another to form towers, as for transmission lines.

FIGS. 5a and 5b suggests heavier folded plate box sections as for a tapered deck cable-stayed bridge.

DESCRIPTION OF PREFERRED EMBODIMENTS AND BEST MODE FOR CARRYING OUT INVENTION

Laminate Composition and Production

Figure 1A:
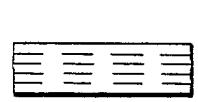
FIGS. 1a to 1k shows several folded plate building framing elements.

The pre-hardened fabric-reinforced cement laminates used for the scoring, folding, and bonding process claimed here typically are $\frac{1}{8}$th to $\frac{3}{4}$th in. thick, contain a mortar matrix of hardened cement with combinations of sand, fly ash, and/or perlite as fine aggregate, and are reinforced with layers of unbonded needle-punched or highloft (3-dimensional) nonwoven fabrics of polypropylene or pitch-based carbon fiber mat. Since the cost per unit volume of the reinforcing fabric is typically 30 to 80 times that of the inorganic mortar matrix, a fabric volume ratio just slightly above the critical fabric volume ratio is usually selected. This amounts to 2.5% to 8% fabric volume ratio in the case of most of the above-mentioned polypropylene fabrics, or typically several layers of fabric comprising 10 to 30 oz./sq. yd. per inch thickness of the laminate, and distributed either uniformly throughout the laminate thickness or with a slight increase in density of fabric toward the two faces of the laminate.

The critical fabric volume ratio referred to in the previous paragraph is the ratio of fabric volume-to-total volume above which tensile strength of a composite exceeds tensile strength of the matrix alone. More importantly, for brittle matrices reinforced with ductile fibers, as in this application, it is the fabric volume ratio above which closely-spaced microcracks occur, changing a brittle material with a single fracture surface and low fracture energy into a pseudo-ductile material which can absorb transient overloads and shocks with little visible damage. Critical fabric volume ratio can be experimentally determined by combining successively smaller amounts of matrix with a fixed amount of fabric, and bending the hardened specimens to observe below what mortar loading the laminate begins to behave pseudo-plastically. The results can be compared with analytical predictions from equations [7].

The laminates are produced by either of two continuous processes [5–7]. The first process comprises screeding and vibrating dry mortar matrix into moving layers of fabric followed by a water spray and subsequent kneading roller compaction to squeeze the water uniformly throughout the thin laminate and densify it. Laminates thicker than about $\frac{1}{4}$th in. must be built in multiple layers in order to obtain adequately uniform water distribution throughout their thicknesses.

The second process comprises screeding or spraying (shotcreting) a wet mortar slurry into the moving fabric layers. An important advantage of the first process over the second is that dry mortar can be more easily worked into a 3-dimensional open-textured low volume ratio fabric without flattening it, thereby causing uneven fabric distribution throughout the thickness of the laminate and leading to low in-plane shear resistance and to delamination.

In a preferred embodiment of this invention the reinforcing fabric for the laminate to be folded consists of an open-textured nonwoven polypropylene layer stitched, needlepunched, or otherwise joined between two open-textured layers of inorganic fabric such as mineral wool or pitch-based carbon fiber. This construction positions the high modulus fibers at the two faces of the cement laminate where they are most efficient in providing bending stiffness to resist buckling of the laminate, and positions the low modulus polypropylene fiber at the center of the laminate cross section to serve as a hinge, equally effective when the laminate is folded in either direction. The low modulus fabric is required because the high modulus face fabrics tend to rupture or pull out of the cement matrix during folding. The open texture of fabric layers is required for ease in vibrating either dry or wet cement mortar into the fabric layers. Additionally, the low modulus central fabric layer contributes impact toughness even in laminates which do not require folding, such as in the upper and lower face laminates bonded to the folded core laminates shown in FIGS. 3a and 3b.

Construction Sequence

The construction sequence for each of the shapes, FIGS. 1 to 4, consists of four steps:

1. Scoring the sheet where folds are to be made.
2. Folding the sheet.
3. Cementing together contacting faces of the folded sheet.
4. Strengthening the folds with a penetrant which hardens the damaged cement.

Scoring can be done by hand with a straight edge and a cutting wheel similar to a pizza cutter. For production runs of parallel folds, such as in FIGS. 1a and 1b, sheets can be fed through a scoring machine identical in operation to the adjustable depth wheel scoring machines used for corrugated paperboard, except that a narrower score is required. To minimize damage at the fold, scores are made at the inside of the fold, the same as in corrugated paperboard practice. For small items, scoring can be eliminated by folding the sheets on a sheet metal breaker.

Figure 1B:
Figure 1C:
Figure 1D:
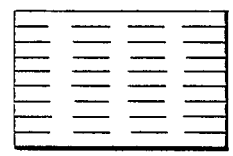
Figure 1E:
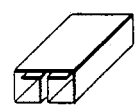
Figure 1F:
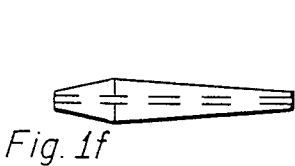
Figure 1G:
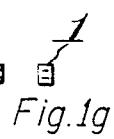
Figure 1H:
Figure 1I:
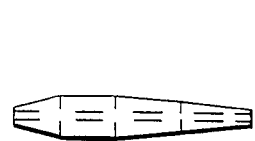
Figure 1J:
Figure 1K:
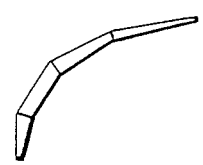
Figure 3A:
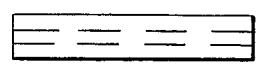
FIGS. 3a to 3g shows folded sandwich panel elements.
Figure 3B:
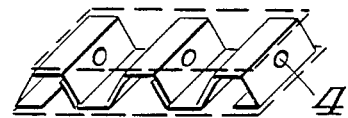

Faces of the laminate may be bonded to other faces of the same sheet of material after folding it, as shown in FIGS. 1a and 1b, or to faces of different sheets of material, as shown in FIGS. 3a and 3b. For some shapes, such as FIGS. 1a and 1b, it is simplest to apply adhesive to faces to be cemented, then fold and press them together. For other shapes, such as FIGS. 3a and 3b, it is simpler to fold the sheet in a fixture first, then apply adhesive to the contacting faces and press them. For example, convenient fixtures for the corrugated shapes of FIGS. 3a and 3b are simply boards butted against each end of the folded member with nails projecting to the inside of each folded corner to fix the member in its folded shape. Contact pressure can be applied by hand, walking on the bonded joint, clamping between boards with C clamps, stacking units on top of one another and weighting them, or by hydraulic press, among other methods.

Figure 3C:

Cylindrical arch panels, as shown in cross section in FIG. 3c, have been made by a 5-step process: (1) banding the inner laminate face with plastic package strapping over curved wood end forms which given the panel the desired shape, (2) applying adhesive to those portions of this inner laminate face and of the scored laminate core which will be in contact after folding and positioning the core, (3) folding and positioning the folded core onto the inner laminate face, (4) applying adhesive to those portions of the core and the outer laminate face which will be in contact, and (5) wrapping the outer laminate face over the folded core and banding it with package strapping to apply pressure across all bonded faces.

For laminates less than about 3/16th in. thick, a convenient method of positioning the folded core onto the inner face in Step (3) has been to staple the core to the inner face at each end of the core fold with a heavy-duty box stapler. At fabric volume ratios above the critical fabric volume ratio, this is quickly done without cracking the laminates. Thicknesses of experimental curved panels produced by this method have varied from 3 in. to 10 in.

A wide range of adhesives are marketed for adhering hardened cement surfaces together. Among these, two-part epoxies are especially suitable because of their wide availability and the wide range of formulations available to vary the pot life and cure time at room temperature and to vary tensile and shear strengths and stiffnesses of the bonded joint.

The two-component 100% solids epoxies can be applied by brush, roller, squeegee, or spray. For small production runs, squeegee application has been the simplest and least expensive. Since thinner coatings can be uniformly applied by spraying than by any of the other methods the reduction in labor and adhesive costs will justify the cost of spray equipment for larger production runs.

Epoxy formulations which have been successfully used include those with room temperature curing times of 15 to 40 minutes and several with 2 to 5 minute curing times at 200° F., having tensile yield strengths exceeding $2 \times 10^3$ psi and tensile moduli exceeding $2 \times 10^5$ psi. Generally, epoxies satisfying ASTM C-881, AASHTO M235 Classes I, II, or III, or Federal Spec. MMM G-650 are suitable.

Epoxy resins are available in many polymer structures and curing agent variations to give a wide range of adhesive joint rigidity. The combination of aliphatic, aromatic, hydroxyl, and ether groups in the epoxy resin, plus amine, ester, and other groups formed by reaction with the curing agent, provide a range of structures, polarities, and hydrogen bonding which is attracted to a wide variety of surfaces, enhancing their widespread use as concrete adhesives.

Of the over 40 companies listed in the 1987 *Concrete Construction Reference Guide* which market epoxy adhesives for hardened concrete surfaces, the following Dural International Corporation products are typical of some which were found useful in the present application:

Dural 109, a 2-component 100% epoxy of sufficiently low viscosity above 45° F. for easy spray application in a thin film.

Dural 104 and 334, epoxy polysulfides, also of low viscosity for spray application.

Dural 100, a 2-part epoxy bonding agent for precast segmental box girder bridges, available in slow, medium, and fast cure types. The fast cure type was preferred for the present application.

In a preferred embodiment, after the adhesive bonds have hardened, members are tipped so that the folds are on an incline and a low viscosity hardening penetrant is poured and allowed to flow down each fold, with the excess being caught in a container at the bottoms of folds for recycling on subsequent folds. A wide range of polymers, mineral-filled polymers and polymer latexes have been evaluated for this purpose, and their costs at different application rates were compared by measuring three-point bending stiffnesses of beams having an equilateral triangular cross section. Currently we use a 50% solids styrene-butadiene latex for this purpose, although several other penetrants are nearly as cost effective. Others include carboxylated acrylic and polyvinyl acetate latexes. The styrene-butadiene has sufficiently low viscosity to flow down the fold readily, effectively penetrates small voids between broken cement particles at the fold, does not require contact with cement to harden, and is therefore also effective in the larger voids, and provides high rigidity of the hardened latex, all at low cost. The material cost of a styrene-butadiene-treated fold in a 0.2 in. thick laminate is in the range of 5¢ to 11¢/per lin. ft. of fold.

In another embodiment, the adhesively-bonded structural shape is dipped into a tank of styrene-butadiene or acrylic latex, removed form the tank to drain, and tipped so that the latex flows into the folds during draining.

Structural Shapes

In the layout view of each figure the dashed lines represent score and fold lines. End insert stiffeners are required in shapes such as FIGS. 1a, 1b, and 3b, i.e. any folded member having a rectangular section which could otherwise be deformed to a parallelogram. End stiffeners can be, for example, adhesively-bonded folded inserts (labeled (1) in FIGS. 1a, 1b and 1c), wood block inserts to which the folded laminate is nailed, or orthogonal diagonal plates wedged between diagonally opposite corners in at least two of the box openings in the cross section.

Figure 2A:
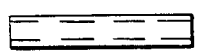
FIGS. 2a to 2h shows representative folded plate elements suitable for roof and wall enclosures.

The standing rib sections, FIG. 2a, can be laid side by side on a roof, nailed to supporting purlins, and the folded cap labeled (2) cemented over each standing rib joint.

Figure 2B:
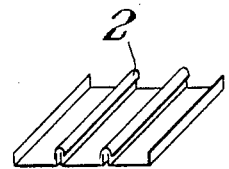
Figure 2C:
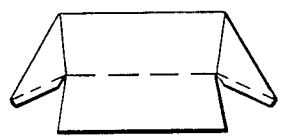

Some units can be nested to conserve space and reduce damage during shipment. For example if the ends of the triangular and trapezoidal roof members, FIGS. 2b and 2c, are tapered outward slightly at their bases, these sections can be completely assembled then nested for shipment. The trapezoidal panel, FIG. 3a, can be nested by leaving off the top face and cementing only that element in the field.

Figure 2D:
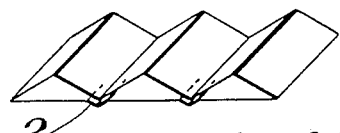
Figure 2E:
Figure 2F:
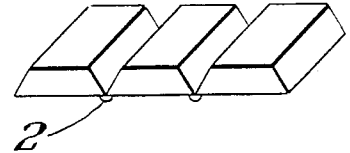
Figure 2G:
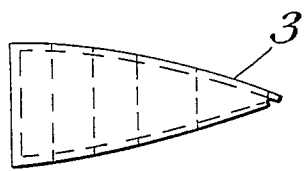
Figure 2H:
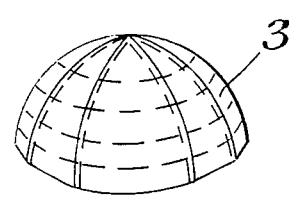

To assemble small models of the segmented dome, FIG. 2d, the scored flat sheets received at the site have been laid against a curved corrugated paperboard template to temporarily provide the proper shape while their folded edge tabs (3) were cemented to one another and C-clamped or stapled with a power boxing stapler.

In sandwich panels, FIG. 3a, the rib web holes labeled (42) can be stamped out prior to folding to provide plumbing and wiring raceways across the ribbed core, or a pathway through which a pipe can be inserted for filling the cavities with blown insulation after the two ends of the ribbed core have been closed with the end stiffeners (1).

The curved panel in FIG. 3c can be made from the same face and core elements as the flat panel in FIG. 3a by simply glueing the folded core to one face then bending it over a form of desired curvature before bonding the opposite face, to make circles, ellipses, or other curved panels.

Figure 3D:
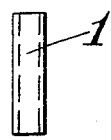
Figure 3E:
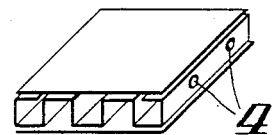
Figure 3F:
Figure 3G:
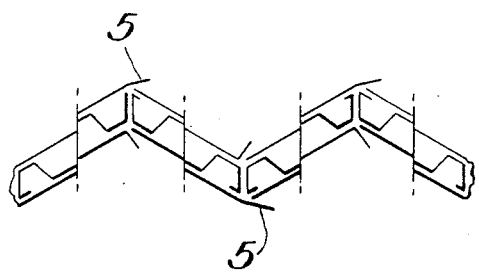

To join panels of the folded panel-folded plate roof structure in FIG. 3d, individual panels can be laid on triangular end trusses then adhesively bonded together with the valley and ridge tabs labeled (5).

The tapered polygonal cross section tower elements, FIG. 4, each having an end stiffener at its top only, can be shipped nested then assembled in the field so that the base of each section fits over the top of the lower and more highly-tapered section.

In the tapered bridge deck, FIG. 5, illustrated with cable-stayed support, element (6) can be inserted as a stiffener after elements (6) and (7) are bonded independently. End stiffeners on each segment similar to (1) in FIG. 1a would then provide abutting flat surfaces by which the asembled deck units can be bonded together with 2-part epoxy, as is currently widely practiced for precast segmental bridge decks.

These sketches and brief descriptions simply suggest the wide variety of shapes and construction methods, all of which are suited to the four-step assembly procedure; score, fold, cement, and strengthen the folds with a penetrant. No claim is made to any of these shapes. They are used for illustrative purpose only.

While the above description contains many specificities, these should not be construed as limitations on the scope of the invention, but rather as exemplifications of preferred embodiments thereof. Skilled artisans will readily be able to use other means for scoring, folding, cementing together the folded laminates, and strengthening the resulting folds with penetrants than those means described here.

I claim:

1. A folded, structural member shaped from hardened, fabric-reinforced cement mortar laminates comprising a first, hardened fabric-reinforced cement mortar laminate having at least one hardened folded area, adhesively bonded to a second, hardened fabric-reinforced cement mortar laminate having a least one folded area; said folded areas of the first an second laminate including a hardened penetrant of polymer latex that hardens said first and second laminates at said folded areas thereof.

2. The structural member of claim 1 where the folded areas have been weakened having a hardening penetrant applied along the folds of said laminates, whereby said cement mortar matrix is hardened where it has been weakened by said folds.

3. The structural member of claim 2 wherein said hardening penetrant is a 50% solids styrene-butadiene latex.

4. The structural member of claim 2 wherein said hardening penetrant is a carboxylated acrylic latex.

5. The structural member of claim 2 wherein said hardening penetrant is polyvinyl acetate latex.

* * * * *